United States Patent [19]

Fecher et al.

[11] Patent Number: 4,953,446
[45] Date of Patent: Sep. 4, 1990

[54] KEY MEMBER FOR RETAINING A CONTROL VALVE IN A HUB

[75] Inventors: Douglas A. Fecher, Granger; Thomas E. Dodd, South Bend, both of Ind.

[73] Assignee: Allied-Signal Inc., Morristown, N.J.

[21] Appl. No.: 392,876

[22] Filed: Aug. 14, 1989

[51] Int. Cl.$^5$ .............................................. F15B 9/10
[52] U.S. Cl. ................................. 91/369.3; 91/369.1
[58] Field of Search ................ 91/369.1, 369.3, 376 R

[56] References Cited

U.S. PATENT DOCUMENTS

| | | |
|---|---|---|
| 3,688,647 | 9/1972 | Kytta . |
| 4,469,009 | 9/1984 | Takayama et al. . |
| 4,472,997 | 9/1984 | Ohmi . |
| 4,487,105 | 12/1984 | Harrison . |
| 4,619,185 | 10/1986 | Mori et al. . |
| 4,633,760 | 1/1987 | Wagner ........................... 91/369.3 |
| 4,729,284 | 3/1988 | Gautier . |
| 4,787,297 | 11/1988 | Tsuyuki et al. . |

FOREIGN PATENT DOCUMENTS

| | | |
|---|---|---|
| 2493784 | 5/1982 | France . |
| 57-107945 | 7/1982 | Japan . |
| 964289 | 7/1964 | United Kingdom . |
| 2076488 | 12/1981 | United Kingdom . |
| 2100379 | 12/1982 | United Kingdom . |

*Primary Examiner*—Allen M. Ostrager
*Attorney, Agent, or Firm*—Leo H. McCormick, Jr.; Ken C. Decker

[57] ABSTRACT

A control valve arrangement for a pressure differential operated servomotor wherein a key member is located in a slot in a hub to retain the control valve and position the control valve in a position to isolate a first chamber from a second chamber in the absence of an input force being applied to operate the valve. The control valve in response to an input force immediately moves to initiate the development of the pressure differential and as a result substantially eliminates the operational time to effect a brake application.

7 Claims, 1 Drawing Sheet

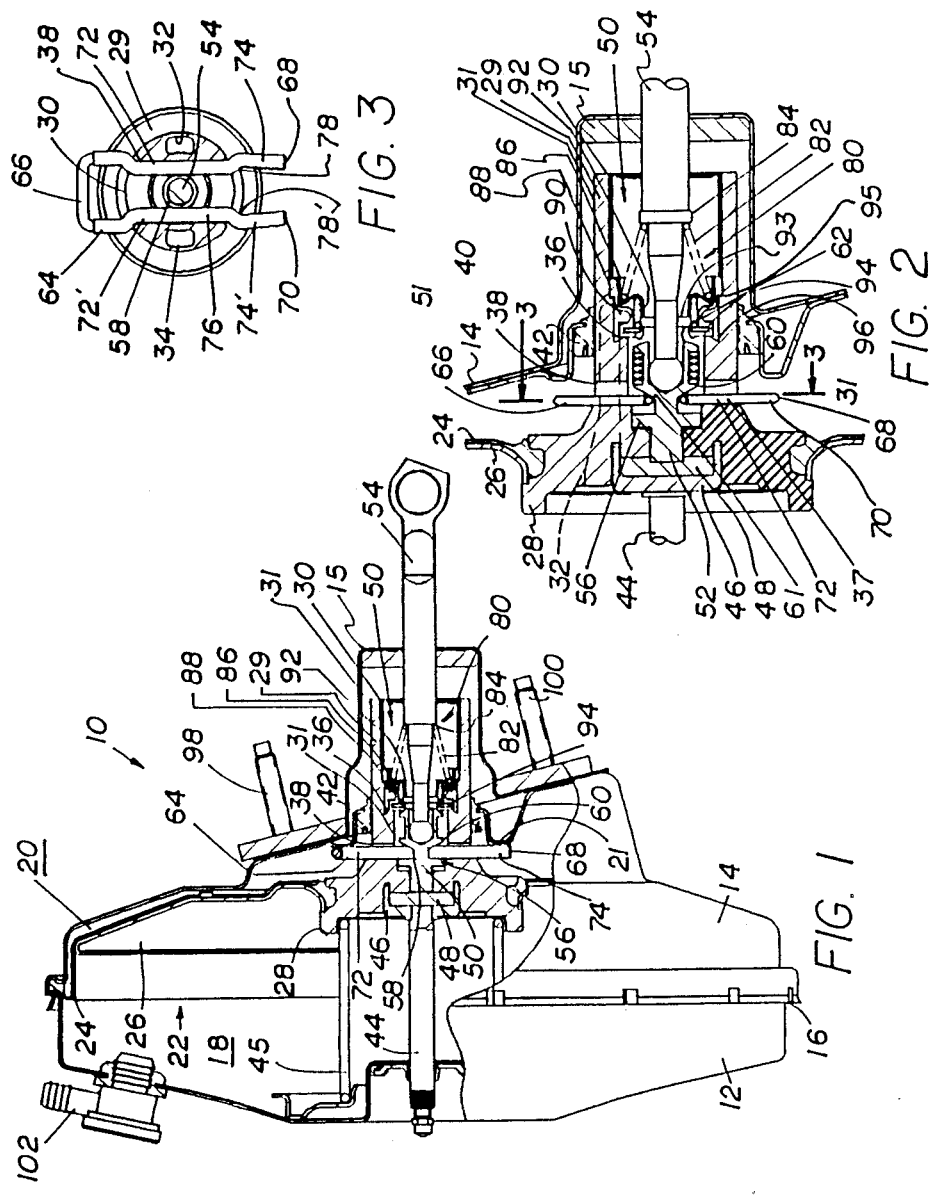

KEY MEMBER FOR RETAINING A CONTROL VALVE IN A HUB

This invention related to a key member for retaining a control valve in a hub connected to a movable wall of a servomotor.

In early servomotors operated through the creation of a pressure differential such as disclosed in U.S. Pat. No. 3,125,003, it was common practice to retain the control valve in a hub by a pin held in place by a bead on the diaphragm which formed part of the movable wall. Later the pin was replaced by a stop member such as disclosed in U.S. Pat. Nos. 3,688,647; 4,619,185; 4,729,284; and 4,787,292 which included either clips or arms that surround the hub to lock the stop member in place and retain the valve in the hub. This type of stop member performed in a satisfactory manner until it was discovered that the actuation pedal travel required to operate a pressure differential servomotor could be reduced by locating the control valve in a ready position after the equalization of the operation chambers as shown in U.S. Pat. Nos. 4,487,105 and 4,562,696. Unfortunately these stop members make a clicking noise when engaging the housing to establish the rest position for the control valve.

In the present invention it was discovered that the actuation time for a servomotor could be further reduced if the control valve was located in the lap or isolated position when the movable was in its rest position. A key member located in a slot in the hub has a base section with legs that extend therefrom. The legs have an arcuate section that surround a plunger and end section. The plunger has a cylindrical body with an atmospheric seat that engages a face on a poppet member and a groove adjacent a first flange that forms a bearing surface that slides in the bore of the hub. The flange contacts the arcuate surface of the key member and moves the key member in the slot in the hub to establish a full release position whereby the atmospheric seat engages the face on the poppet member and correspondingly moves the face from a vacuum seat to allow free and unrestricted communication between the front and rear chambers whereby the pressure differential is rapidly dissipated as the pressures therein equalize. As a return spring moves the movable wall toward the rear chamber, the base member and end sections of the legs of the key member engage the rear shell to hold the plunger stationary as the hub and movable wall continue to move toward the rear shell. When the movable wall engages the rear shell, the face of the poppet member is again seated on both the atmospheric seat on the cylindrical body of the plunger and the vacuum seat on the hub to isolate the front chamber from the rear chamber. Thus, when an input force is again applied to move the plunger, the pressure differential can immediately commence. The key member is coated with a resilient material such that any sound or noise associated by the movement in the slot and the engagement with flange on the cylindrical body is attenuated. In addition a second flange on the cylindrical body engages the arcuate section as the plunger is moved toward its maximum stroke by the input force to cushion any noise that may be caused by the engagement of the first flange with the hub. Further, a ring of filter material surrounds the cylindrical body to define a smooth surface from the atmospheric seat to reduce the creation of turbulence in the air as it flows through the body to the slot for presentation to the second or rear chamber.

It is an object of the present invention to provide a servomotor operated by a pressure differential with a control valve which is positioned in a hub by a key member such that in the rest position for a movable wall, the front and rear chambers are isolated from each other.

It is a further object of the present invention to provide a control valve with a retention key that attenuates the creation of noise when operational fluid is presented to a rear chamber to create an operational pressure differential.

An advantage of this invention occurs in the reduction in pedal travel that is required to effect a brake application since a plunger is located at a lap position when a movable wall is in the rest position and the development of a pressure differential commences immediately with the movement of the plunger by an input force.

These objects and advantages should be apparent from reading this specification while viewing the drawings, in which:

FIG. 1 is a schematic illustration of a brake booster with a control valve which is retained in a hub by a key member in accordance with the principles of this invention;

FIG. 2 is an enlarged sectional view of the control valve in a fully actuated position; and FIG. 3 is a sectional view taken along line 3—3 of FIG. 2 showing the key member, hub and plunger.

The servomotor 10 shown in FIG. 1 is designed to be connected to a master cylinder in a brake system to assist in providing the input force required to operate the master cylinder and effect a brake application. The servomotor 10 is designed to be quite, efficient and provide an immediate input force to operate the master cylinder in response to an operator input.

The servomotor 10 has a front shell 12 joined to a rear shell 14 by a series of lances and tabs 16 to form a closed housing. The interior of the closed housing is divided into a front chamber 18 and a rear chamber 20 by a movable wall 22. The movable wall 20 includes a diaphragm 24, backing plate 26 and a hub 28. Hub 28 has a cylindrical body 29 with a stepped bore 30 that extends therethrough, a plurality of passages 32 and 34, see FIGS. 2 and 3, that extend to an annular vacuum seat 36, and a radial slot 38. The cylindrical body 29 extends through an opening 40 in the rear shell 14 into the surrounding environment. A seal 42 of the type disclosed in U.S. patent application Ser. No. 238,950 filed Aug. 31, 1988 located between opening 40 and the exterior surface 31 on the cylindrical projection 29 seals chamber 20 from the surrounding environment.

An output push rod 44 has a head 46 that enclosed reaction disc 48 located in the stepped bore 30. The output push rod 44 engages a piston in the master cylinder.

A control valve 50 located in bore 30 has a plunger 52 connected to an input push rod 54 attached to a brake pedal. Plunger 52 has first flange 56 that engages bore 30 to establish a bearing surface on hub 28, a groove 58, a contoured second flange 60 and a tapered atmospheric seat 62 located of the end thereof. In order to reduce turbulence in the flow of fluid under pressure around the plunger 52, a light weight material 51, which in the present instance is a polyuthene-foam, which is placed on the plunger 52 to form a smooth surface.

A key member 64 as best shown in FIG. 3 has a base member 66 with legs 68 and 70 that extend therefrom. Each leg 68 and 70 has an arcuate section 72, 72' and an end section 74, 74'. The key member is made of a cylindrical wire that is bent into the shape shown in FIG. 3. Thereafter a rubber or plastic coating 76 is either placed thereon by dipping or by placing a piece of heat responsive tubing over the wire 64 and set by the application of heat or molding a coating around the key member 64. The key member 64 is inserted in slot 38 to hold plunger 50 in bore 30.

During the insertion, ends 68 and 70 are pinched together until tangents 78, 78' engage groove 58 on plunger 50 expand as the arcuate section 72, 72' move into the cylindrical body 29 and later expand to lock the key member 64 in the cylindrical body 29 as shown in FIG. 3.

Prior to the insertion of the plunger 50 into bore 30, poppet valve 80 is attached to the push rod 54. Poppet valve 80 includes return spring 82 which has first end located on shoulder 84 of the push rod 54 and a second that engages retainer 86. A bead 88 on the end of the flexible section 90 surrounds the retainer 86 and a valve spring 92 urges valve face 94 on disc 93 away from the retainer 86. On insertion of the plunger 50 into bore 30, retainer 86 holds bead 88 against shoulder 95 such that in the rest position face 94 is seated on atmospheric seat 62 to define the limits for passages 32 and 34 within bore 30.

The servomotor 10 is installed in a vehicle through mounting bolts 98 and 100 and push rod 54 attached to the brake pedal. Check valve 102 in the front shell 12 is connected to the intake manifold of the vehicle. When the vehicle is operating, vacuum present at the intake manifold evacuates air from chamber 18. An evacuation pressure differential acts on plunger 50 to move face 94 away from vacuum seat 36 to allow any air present in chamber 20 to be evacuated into chamber 18 via bore section 31 and slot 38 and equalize the pressure in chambers 18 and 20. When the pressure in chambers 18 and 20 equalized valve spring 92 again seats face 94 on vacuum seat 36 to isolate chamber 20 from chamber 18. In response to an input force applied to push rod 54, plunger 54 moves atmospheric seat 62 away from face 94 to allow air to flow through filter 15 into bore 30 for immediate presentation to chamber 20. With air in chamber 20 and vacuum in chamber 18, a pressure differential is created across wall 22. The pressure differential acts on wall 22 to produce an output force which is transferred into hub 28 and through reaction disc 48 to push rod 44. The output force overcomes return spring 45 to supply the master cylinder with an actuation force corresponding to the input force applied to push rod 54. On termination of the input force on push rod 54, return spring 82 moves plunger 50 toward disc 93 to bring atmospheric seat 62 into engagement with face 94 to terminate the flow communication of air through bore 30. At this time flange 56 engages arcuate segments 72, 72' on key member 64 to move key member 64 into engagement with the bottom 39 of slot 38 to define a full release position whereby air is now evacuated from chamber 20 to chamber 18, via slot 38, bore section 31 and passages 32 and 34, to equalize the pressure therebetween. As wall 22 approaches the rear shell 14, the base section 66 and end members 74, 74' of the key member 64 engages stop 21 on the rear shell 14 to hold plunger 50 stationary as the hub 28 and wall 22 continues to move toward the rear shell 14 by the force of the return spring 45. The size of the plurality of openings 32 and 34 and the slot 38 is such that the fluid pressure in chambers 20 and 18 is substantially identical when the key member 64 engages stop 21. As the hub 28 continues to move toward the rear shell 14, key member 64 moves in slot 38 such that when wall 22 reaches its rest position, arcuate sections 72, 72' engage the top 37 of slot 38. With the key member 64 positioned at the top 37 of the slot 38, valve spring 92 seats face 94 on vacuum seat 36 to inhibit fluid communication between chambers 18 and 20. Thus, the control valve 50 is in the ready position to allow air to immediately flow to the rear chamber 20 on movement of the plunger 50 by an input force.

Under some circumstances, the input force applied to the brake pedal is rapid and as a result the control valve 50 is moved to a full actuation position as shown in FIG. 3. As the plunger 50 approaches the maximum movement, tapered surface 61 on the second flange 6 engages the arcuate surfaces 72, 72' on key member 64 to cushion input force and attenuate any noise that may be produced by this type of application.

We claim:

1. A key member located in a slot in a hub for retaining a plunger of a control valve in a bore of the hub, said hub being attached to a movable wall that separates the interior of front and rear shells into first and second chambers, said front and rear shells being joined together to define a housing for a servomotor, said plunger responding to an actuation force from an input member by initially moving from a lap position where the first and second chambers are isolated from each other and to an actuation position where the second chamber is connected to a source of fluid under pressure to develop a pressure differential across the movable wall, said pressure differential creating an output force in said wall corresponding to said input force, said plunger on termination of said actuation force engaging and moving said key member in said slot into engagement with said hub to establish a full release position for said control valve whereby said first and second chambers are connected to each other to allow the fluid pressure therein to equalize, said key member being characterized by a base section with parallel first and second legs that extend therefrom, each of said first and second legs having an arcuate section that projects inwardly toward the other leg and an end section, said arcuate section engaging said hub and a flange on said plunger engaging said arcuate section to establish said full release position while said base section and end sections engage said rear shell as the wall approaches the rear shell to hold the plunger stationary as said hub continues to move toward said rear shell, said arcuate section engaging said flange to locate said plunger in said lap position when the wall engages the rear shell.

2. The key member as recited in claim 1 wherein said arcuate section is further characterized by the engagement with a second flange on said plunger to limit the movement of the plunger in response to the actuation force and provide a resilient cushion for the plunger as the plunger approaches the maximum movement in the actuation position to prevent the development of noise as the plunger engages the hub.

3. The key member as recited in claim 2 being further characterized by a resilient member surrounding the base section, arcuate sections and legs to further reduce the development of noise.

4. The key member as recited in claim 3 wherein said hub is characterized by a plurality of openings to allow rapid equalization between said first and second chambers when said valve is in the full release position.

5. The key member as recited in claim 4 wherein said slot is characterized such that the location of the arcuate sections in the hub do not interfere with the free flow of fluid between the first and second chambers during equalization of the fluid pressure therebetween.

6. The key member as recited in claim 5 wherein said slot in said hub is characterized as the flow path through which the second chamber is connected to the source of fluid under pressure.

7. The key member as recited in claim 6 wherein said plunger is further characterized by a smooth surface to direct said fluid under pressure through said bore and to said slot without substantial turbulence.

* * * * *